2,834,953
Patented May 13, 1958

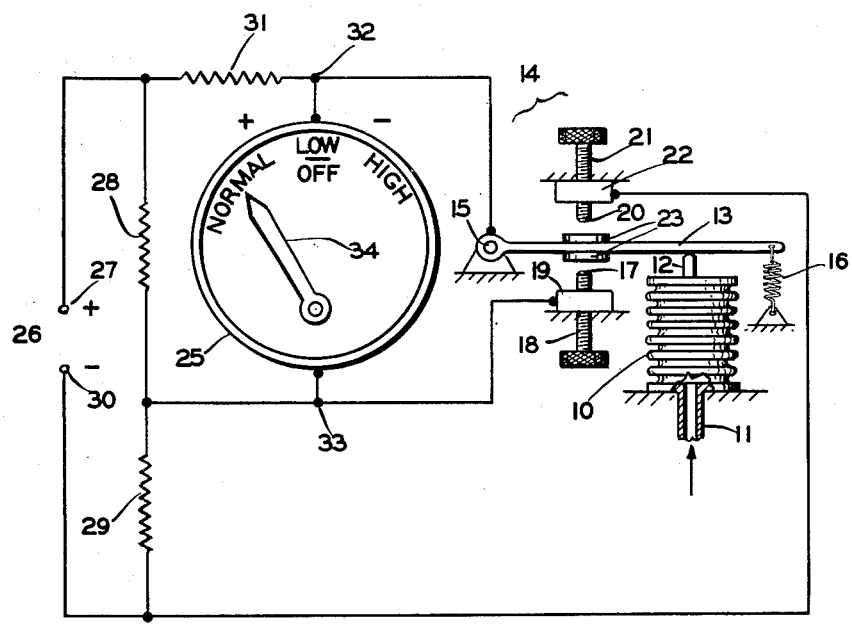

2,834,953

PRESSURE INDICATING SYSTEM

Paul F. Bechberger, Tenafly, N. J., and Donald F. Hastings, Suffern, N. Y., assignors to Bendix Aviation Corporation, Teterboro, N. J., a corporation of Delaware Application March 14, 1955, Serial No. 494,192

4 Claims. (Cl. 340—236)

This invention relates to fluid pressure indicating systems, and especially to a system arranged to show whether the pressure is above, within or below a prescribed range of pressures.

Fluid pressure indicating systems are generally designed to show pressure in pounds per square inch or other units, and require complicated and expensive equipment which must be calibrated. An object of the invention is to provide a simple but novel arrangement that dispenses with pressure gauges and meters of the usual type, but which will indicate accurately the departure of pressure from a prescribed operating range between predetermined upper and lower limits.

Another object is to provide a pressure indicating system of this type in which the upper and lower limits can be readily set and changed.

A further object is to provide a pressure indicating system including a novel electrical indicator and operating circuit. A related purpose is to provide an improved pressure indicator circuit actuated by a pressure-operated switch.

A further object is to utilize in a pressure indicating system an indicator of the galvanometer type, and a related object is to operate an indicator of this type by a pressure-actuated switch.

Another object is to provide a pressure indicating system utilizing a pressure-operated bellows to actuate an electrical indicating circuit, and a related object is to operate such a circuit by a switch actuated by such bellows.

In installations where it is important to provide an indication when pressure drops below an established minimum, and where electricity is required for operation, it frequently is also important to provide an indication when the electrical power fails. An object of the invention is to provide an indicating system that will not only show a pressure drop below the minimum but which is also arranged to indicate power failure.

The foregoing and other objects and advantages of the invention will appear more fully from consideration of the detailed description which follows, in conjunction with the accompanying drawing wherein one embodiment of the invention is illustrated. It is to be expressly understood, however, that the drawing is for the purposes of illustration and description and is not to be construed as defining the limits of the invention.

The drawing is a diagram of an embodiment of the invention. The system comprises in general an electrical indicator of the meter type, arranged to indicate three positions in accordance with the voltage applied across the meter, these positions representing pressures above the maximum, below the minimum, and between maximum and minimum respectively. Connected to the meter is an energized circuit including a switch actuated by a bellows or its equivalent, arranged to apply the appropriate voltages to the indicator in response to corresponding movements of the bellows.

The circuit, switch and meter are also arranged so that upon the failure of power supply to the circuit, the meter indicator will be located in the position which designates pressure below the selected minimum.

In the preferred arrangement the meter indicator is of the galvanometer type, and the circuit energizing the meter is arranged so that the voltage applied thereto has one polarity when the pressure is above the selected maximum, and opposite polarity when the pressure is between the predetermined maximum and minimum, so that when the pressure is below said minimum, or when the power fails, no voltage will be applied across the indicator, which then will be located in its central position. The indicator energizing circuit is arranged so that the bellows-operated switch will function to create these voltages across the meter under appropriate conditions.

One circuit arrangement which performs in this manner is diagrammatically illustrated in the drawing. It includes a sealed bellows 10 of well-known type whose interior is connected through pipe 11 to a source of pressure whose values are to be indicated. The free end 12 of bellows 10 is maintained in engagement with movable arm 13 of switch 14, as by mounting said arm on pivot 15 and biasing it against bellows end 12, as by tension spring 16.

Switch contacts are located at opposite sides of arm 13 in position for electrical contact with said arm when shifted by bellows 10; and said contacts are advantageously adjustable so that the switch may be set to close at selected maximum and minimum pressure values. In the form diagrammed, an inner contact 17 on the same side of arm 13 as bellows 10 is carried by a manually rotatable inner adjusting screw 18 threaded through a fixed abutment indicated at 19. An outer contact 20 is located on the end of manually rotatable outer adjusting screw 21 threaded through a fixed abutment indicated at 22. Arm 13 is advantageously provided with contact plates 23 of suitable metal located on opposite sides of the arm and positioned to engage contacts 17 and 20.

Switch 14 is connected to an electrical pressure indicator 25, which in the preferred form is of the galvanometer type. Indicator 25 is connected to a source of direct current 26 having upper pole 27 connected through resistors 28 and 29 in series with the lower pole 30. Upper pole 27 is also connected through a resistor 31 to a terminal 32 of indicator 25, said terminal being connected likewise to contact plates 23, preferably through arm 13, which advantageously is made of metal. The other terminal 33 of indicator 25 is connected to the junction between resistors 28 and 29 and to contact 17, advantageously through metal abutment 19 and screw 18. Contact 20 is similarly connected to the lower pole 30 of the source through metal abutment 22 and screw 21.

This arrangement is illustrated with the switch 14 in intermediate position, in which the pressure in bellows 10 is between the selected upper and lower limits. Under these conditions switch 14 is open. Since the upper terminal 32 of the indicator 25 is more positive under these conditions than the lower terminal 33, the indicator pointer 34 will be shifted by the galvanometer winding in a corresponding direction. For illustrative purposes the upper pole 27 has been indicated as positive, and the pointer 34 has been shown as shifted to the left.

When the pressure in bellows 10 increases and the bellows expands, contact 20 will engage the adjacent contact plate 23 and close the circuit between the galvanometer indicator terminal 32 and negative pole 30 when the pressure reaches the maximum value, thereby making the latter terminal substantially more negative than terminal 33, and reversing the polarity applied to the galvanometer. This will shift pointer 34 to the right hand limit position to indicate a pressure above the prescribed maximum. With the switch 14 in this position resistor 31 serves as a load across the poles 27, 30, preventing a short circuit. If desired, arm 13 may be sufficiently yieldable so that when the pressure exceeds the maximum, no material strain will be placed upon the parts.

When the pressure in bellows 10 decreases, switch arm 13 will be moved downwardly, being maintained in contact with the bellows end 12 as by spring 16; and if such pressure decrease continues, contact 17 will engage the adjacent contact plate 23 and close a circuit between terminals 32 and 33 of indicator 25, thereby short-circuiting the indicator. In this condition the pointer 34 will move to central position, since no voltage is applied across the galvanometer winding, thereby indicating that the pressure has dropped below the lower limit of proper operation. Obviously, if the power fails at source 26, pointer 34 will also assume central position, which will then indicate power failure.

The exact minimum and maximum pressures constituting the limits of proper operation can be very readily set or adjusted with the arrangement shown, it being necessary only to rotate the appropriate adjusting screw 18 or screw 21 to have the indicator function at a selected limit. The parts employed in the system are of standard type, simple and inexpensive. Indicator 25 may be of a low price type, since no accuracy of operation or calibration is required, the only requirement being that it is shifted to either side when voltages of the proper polarity are applied to close its terminals. It is adapted for operation by very low currents. While the system has been diagrammatically shown, it will be evident that commercial embodiments may be designed in extremely compact form.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. A fluid pressure condition indicating system comprising a first circuit means connected to a source of direct current voltage, a single pole double throw switch including a pair of electrical contacts and a switch arm having a normal position out of contacting relation with said contacts and alternately movable into contacting relation with one or the other of said pair of contacts, fluid pressure responsive means to operatively position said switch arm, a voltmeter type indicator having a first and a second terminal operatively connected in said first circuit means, said first circuit means including electrical resistance means effective to apply a normal voltage to said indicator upon said switch arm being adjusted by said fluid pressure responsive means to said first-mentioned normal position and out of contacting relation with said contacts so as to cause said indicator to be adjusted to a first position indicative of a normal fluid pressure condition, one of said contacts being connected to the first terminal of said indicator and the said switch arm being connected to the second terminal of said indicator, said fluid pressure responsive means being so arranged as to adjust said switch arm to a second position to close said one contact upon the fluid pressure decreasing below a predetermined normal fluid pressure range, said switch arm upon closing said one contact short circuiting the indicator to cause the indicator to be adjusted to a second position indicative of a low fluid pressure condition, the other of said pair of contacts being connected to a terminal of the direct current voltage means, said fluid pressure responsive means being so arranged as to adjust said switch arm to a third position to close said other contact upon the fluid pressure increasing above a predetermined normal fluid pressure range, a second circuit means completed upon the closing of said other contact by said switch arm to apply a different voltage to said indicator to cause the indicator to be adjusted to a third position indicative of a high fluid pressure condition, and said voltmeter type indicator being so arranged in said first and second circuit means that failure of said source of direct current voltage causes said indicator to be adjusted to the aforementioned second position as an indication thereof.

2. A fluid pressure condition indicating system as defined by claim 1 in which the first circuit means includes a bridge circuit to apply the first-mentioned normal voltage to said indicator, and the second circuit means includes the switch arm cooperating with the other contact to complete a circuit through a normally open leg of said bridge circuit for applying the different voltage to the indicator upon the fluid pressure increasing above the predetermined normal fluid pressure range.

3. A fluid pressure condition indicating system as defined by claim 1 in which said contacts are adjustable toward and from the switch arm, and thereby permit independent adjustment of the upper and lower limits of the normal pressure range.

4. A fluid pressure condition indicating system as defined by claim 1 in which the pressure responsive means is a bellows engaging the switch arm and internally connected to the source of pressure to be indicated.

References Cited in the file of this patent

UNITED STATES PATENTS

| 2,270,148 | Stowe | Jan. 13, 1942 |
| 2,669,876 | Lentz | Feb. 23, 1954 |

FOREIGN PATENTS

| 974,827 | France | Oct. 4, 1950 |